US012502311B2

United States Patent
White et al.

(10) Patent No.: US 12,502,311 B2
(45) Date of Patent: Dec. 23, 2025

(54) OCULAR IMPLANT AND METHOD OF MAKING SAME

(71) Applicant: WESTERN SYDNEY LOCAL HEALTH DISTRICT, New South Wales (AU)

(72) Inventors: Andrew White, New South Wales (AU); Philip Boughton, New South Wales (AU)

(73) Assignee: WESTERN SYDNEY LOCAL HEALTH DISTRICT (AU)

( * ) Notice: Subject to any disclaimer, the term of this patent is extended or adjusted under 35 U.S.C. 154(b) by 440 days.

(21) Appl. No.: 17/909,089

(22) PCT Filed: Mar. 2, 2021

(86) PCT No.: PCT/AU2021/050179
§ 371 (c)(1),
(2) Date: Sep. 2, 2022

(87) PCT Pub. No.: WO2021/174298
PCT Pub. Date: Sep. 10, 2021

(65) Prior Publication Data
US 2023/0109038 A1    Apr. 6, 2023

(30) Foreign Application Priority Data

Mar. 4, 2020    (AU) ................. 2020900649

(51) Int. Cl.
*A61F 9/007*    (2006.01)
*A61F 9/00*    (2006.01)
(52) U.S. Cl.
CPC ........ *A61F 9/00781* (2013.01); *A61F 9/0017* (2013.01)
(58) Field of Classification Search
CPC .................... A61F 9/00781; A61F 9/0017
See application file for complete search history.

(56) References Cited

U.S. PATENT DOCUMENTS

| 2004/0162545 A1 | 8/2004 | Brown et al. |
| 2004/0193095 A1* | 9/2004 | Shadduck ........... A61F 9/00781 |
| | | 977/944 |

(Continued)

FOREIGN PATENT DOCUMENTS

| JP | 2018149049 A | 9/2018 | |
| WO | WO2018232248 | 12/2018 | |
| WO | WO-2018232248 A1 * | 12/2018 | ......... A61F 9/00781 |

OTHER PUBLICATIONS

European Search Report 21764651.2 Issued on Mar. 4, 2024.
Office action issued in counterpart Japanese Application No. 2022553684 and English Translation; Issued May 27, 2025.

*Primary Examiner* — Jessica Arble
(74) *Attorney, Agent, or Firm* — The Belles Group, P.C.

(57) ABSTRACT

An ocular implant (10) for conveying intraocular fluid away from a site of excess intraocular fluid within a patient, the implant (10) including: a body (12) including one or more drainage channels (20) each having an outlet (24) fluidly communicable with drainage site located away from the site of excess intraocular fluid; and an elongated tubular member (30) fluidly communicable with the body (12), the member (30) having a first end portion (32) providing an inlet (38), a second end portion (34) providing an end (40), and a lumen extending between the inlet (38) and the end (40), wherein the inlet (38) is fluidly communicable with the site of excess intraocular fluid so that the intraocular fluid is able to flow past the inlet (38) and through the lumen towards the end (40), and wherein the second end portion (34) includes one or more openings (42) each fluidly communicable with a respective one of the one or more drainage channels (20) to permit the intraocular fluid to flow from the second end portion (34) to each of the outlets (24).

6 Claims, 5 Drawing Sheets

(56) References Cited

U.S. PATENT DOCUMENTS

| | | |
|---|---|---|
| 2007/0293807 A1 | 12/2007 | Lynch et al. |
| 2009/0287136 A1* | 11/2009 | Castillejos .......... A61F 9/00781 604/9 |
| 2010/0249691 A1 | 9/2010 | Van Der Mooren et al. |
| 2011/0144559 A1* | 6/2011 | Lafdi ..................... A61L 29/02 604/8 |
| 2016/0058616 A1 | 3/2016 | Camras et al. |
| 2019/0224047 A1 | 7/2019 | Kao et al. |
| 2019/0374384 A1 | 12/2019 | Xie et al. |
| 2021/0137736 A1* | 5/2021 | Cavuto ............... A61F 9/00781 |

\* cited by examiner

OCULAR IMPLANT AND METHOD OF MAKING SAME

FIELD

The present invention relates to ocular implants and in particular relates to, but is not limited to, an ocular shunt for the treatment of glaucoma.

BACKGROUND

Glaucoma is a disease of the eye typically characterised by inadequate regulation of pressure within the eye commonly referred to as intraocular pressure (TOP). An increase in TOP above physiologically normal levels may lead to irreversible damage and loss of vision in the diseased eye.

Known ocular implants aim to ameliorate the pathology of glaucoma by typically diverting or shunting fluid within the eye, referred to as aqueous humour, away from the site of excess fluid to attempt to lower TOP towards physiologically normal levels.

Many of these known ocular implants do not provide adequate regulation of TOP or have other potential drawbacks such as relatively high cost and low accessibility.

Object

It is an object of the present invention to substantially overcome, or at least ameliorate, one or more of the above drawbacks.

SUMMARY OF INVENTION

There is disclosed herein an ocular implant for conveying intraocular fluid away from a site of excess intraocular fluid within a patient, the implant including:
  a body including one or more drainage channels each having an outlet fluidly communicable with a drainage site located away from the site of excess intraocular fluid; and
  an elongated tubular member fluidly communicable with the body, the member having a first end portion providing an inlet, a second end portion providing an end, and a lumen extending between the inlet and the end,
  wherein the inlet is fluidly communicable with the site of excess intraocular fluid so that the intraocular fluid is able to flow past the inlet and through the lumen towards the end, and
  wherein the second end portion includes one or more openings each fluidly communicable with a respective one of the one or more drainage channels to permit the intraocular fluid to flow from the second end portion to each of the outlets.

Preferably, the body includes a plurality of drainage channels in the form of elongated tubular elements.

Preferably, each of the elements are arranged parallel to each other to form an array.

Preferably, the second end portion is located at least partially within the body and extends transverse to the array.

Preferably, the second end portion extends transversely through each of the channels.

Preferably, the elongated tubular member is in the form of a modified medical drainage catheter.

Preferably, the body is in the form of a modified multitubular medical drain.

There is also disclosed herein a device for guided assembly of an ocular implant, the implant having a body and an elongated tubular member, the body including a plurality of elongated open-ended tubular elements arranged parallel to each other to form an array, the member having a first end portion and a second end portion, the device including:
  a base to locate the body; and
  first and second sidewalls extending from the base at a periphery thereof to limit movement of the body relative to the base, with the first and second sidewalls being arranged transverse relative to each other,
  wherein the first sidewall includes an opening to permit a piercing device to pass therethrough to pierce each of the tubular elements of the body to form a passage extending transversely through the array so that the second end portion may pass through the passage, and
  wherein the second sidewall includes a plurality of apertures to be aligned with a respective one of the open ends of each of the tubular elements so that the piercing device may pass through the aperture and through the open end to laterally pierce the second end portion.

Preferably, the first sidewall includes a first cut-out portion arranged at an outer end portion of the opening, and the second sidewall includes a plurality of second cut-out portions each respectively arranged at an outer end portion of each of the apertures, with the first and second cut-out portions at least facilitating the passing of the piercing device.

Preferably, the device further includes a support portion integrally formed with the base to at least facilitate handling of the device.

Preferably, the support portion includes a contoured grip portion generally aligned with the first sidewall.

Preferably, the opening is a first channel extending through the first sidewall, and each of the apertures is a second channel extending through the second sidewall.

There is further disclosed herein a method of guided assembly of an ocular implant, the implant configured to convey intraocular fluid away from a site of excess intraocular fluid within a patient, the method including:
  providing a device for guided assembly of the ocular implant, the device including:
    a base; and
    first and second sidewalls extending from the base at a periphery thereof, with the first and second sidewalls being arranged transverse relative to each other,
    wherein the first sidewall includes an opening, and
    wherein the second sidewall includes a plurality of apertures;
  providing a multitubular medical drain, the drain having a plurality of elongated tubular elements arranged parallel to each other to form an array, with each of the elements having an outlet formed at each end of the element;
  sizing the drain to enable the drain to be locatable on the base of the device;
  locating the drain on the base and arranging the drain so that each of the outlets are aligned with a respective one of the apertures;
  piercing the drain through the opening to form a passage through the drain extending transversely through the array;
  providing a medical catheter having a first end portion providing an inlet, a second end portion providing an end, and a lumen extending between the inlet and the end;
  positioning the second end portion through the passage of the drain; and piercing the second end portion through each of the apertures to form a plurality of openings in the second end portion, with each of the openings being fluidly communicable with a respective one of the outlets.

BRIEF DESCRIPTION OF DRAWINGS

Exemplary embodiments of the present disclosure will now be described, by way of examples only, with reference to the accompanying description and drawings in which.

DESCRIPTION OF EMBODIMENTS

Figure 1:
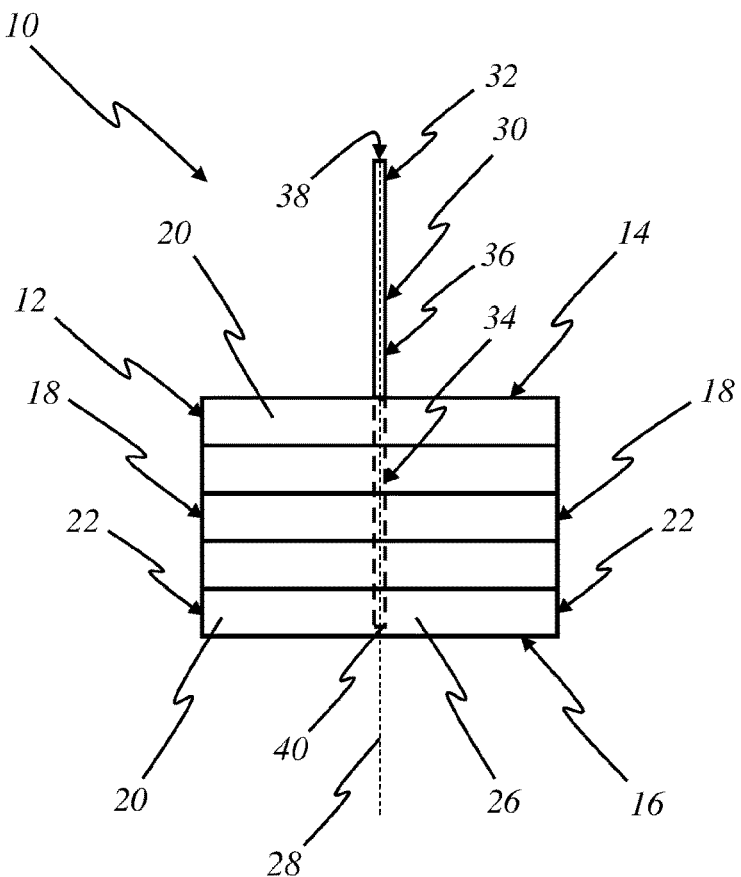
FIG. 1 is a schematic front view of an ocular implant according to an embodiment of the present disclosure.
Figure 2:
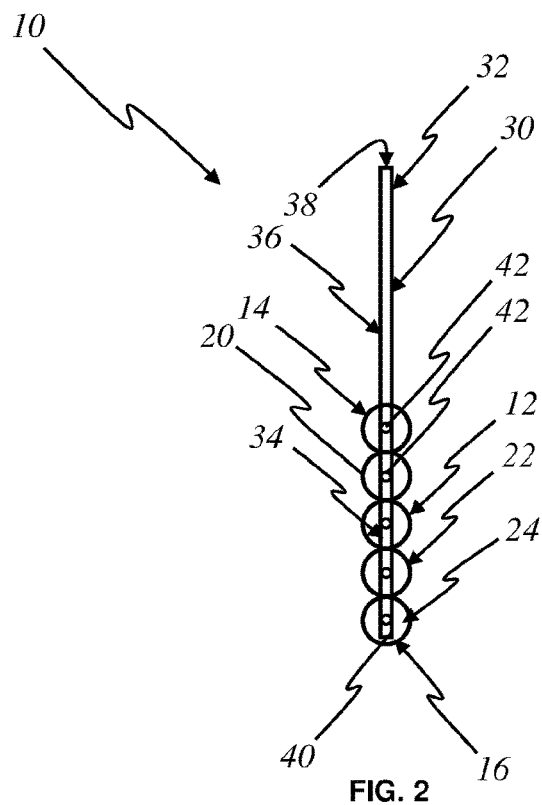
FIG. 2 is a schematic side view of the ocular implant of FIG. 1.

Referring to FIGS. 1 and 2 of the accompanying drawings, there is schematically depicted an ocular implant or shunt 10 for conveying intraocular fluid away from a site of excess intraocular fluid within a patient. In the embodiment depicted, the shunt 10 is configured to convey aqueous humour away from the anterior chamber of the eye. The shunt 10 may be used in the treatment of glaucoma by being configured to lower intraocular pressure (IOP) towards physiologically normal levels.

The shunt 10 includes a body 12. In the embodiment depicted, the body 12 is generally rectangular in configuration and has a pair of longitudinal opposing proximal and distal side portions 14, 16, and a pair of opposing lateral side portions 18 each extending transversely between the proximal and distal side portions 14, 16. The body 12 has a length dimension of about 20 mm, a height dimension of about 15 mm, and a width dimension of about 2 mm. Although, it will be appreciated that the shape and dimensions of the body 12 may be varied. For example, the body 12 may be circular, square, hexagonal or other polygonal in configuration.

The body 12 includes a plurality of drainage channels in the form of elongated tubular elements 20. Each tubular element 20 has a pair of opposite open end portions 22 forming the lateral side portions 18 of the body 12. An outlet 24 (FIG. 2) is provided at each end portion 22 to fluidly communicate with a drainage site, such as Schlemm's channel, located away from the site of excess intraocular fluid, that is, the anterior chamber. A length 26 of each element 20 extends between the respective end portions 22 and provides a lumen extending between the outlets 24 through which intraocular fluid or aqueous humour may flow. In the embodiment depicted, each of the lengths 26 and the outlets 24 has an outer diameter of about 2 mm. Each of the elements 20 is preferably formed of a material offering relatively good flexibility, elasticity, and biocompatibility, such as medical grade silicone.

Each tubular element 20 is joined at its longitudinal side with an adjacent tubular element 20 to form a parallel array of tubular elements 20. The array has an axis of symmetry 28 extending transversely between the proximal and distal side portions 14, 16 relative to the elements 20. Those elements 20 which are arranged at the outer longitudinal portions of the array form the proximal and distal side portions 14, 16. In this way, the arrangement of the tubular elements 20 provides a generally undulating or corrugated profile of the body 12.

In one or more embodiments, the body 12 may be conveniently formed by modifying standard multitubular medical tissue drains (such as abdominal drainage tubing) readily available in clinical settings (such as hospitals) worldwide.

The shunt 10 further includes an elongated tubular member 30 fluidly communicable with the body 12. The member 30 has a first end portion 32 providing an inlet 38, a second end portion 34 providing a distal end 40, and a length 36 extending between the inlet 38 and the end 40. The length 36 provides a lumen through which intraocular fluid or aqueous humour may flow. The first end portion 32, length 36, and second end portion 34 preferably have an outer diameter in the range of about 0.5 mm to 0.9 mm, more preferably 0.7 mm. The member 30 is preferably formed of the same material as the body 12 or may be formed of other suitable material.

The inlet 38 is fluidly communicable with the site of excess intraocular fluid (that is, the anterior chamber) so that the intraocular fluid is able to flow past the inlet 38 and through the lumen of the length 36 towards the end 40.

In the embodiment depicted, the second end portion 34 extends through a passage or tunnel formed along the axis 28 through each of the elements 20. The distal end 40 of the second end portion 34 terminates within the element 20 forming the distal side portion 16. Although, it may be envisaged that the second end portion 34 may be arranged entirely above the elements 20 or offset relative to the axis 28.

The second end portion 34 is perforated to provide a plurality of openings 42 (FIG. 2) to the lumen of the length 36. Each opening 42 is fluidly communicable with a respective one of the lumens of the lengths 26 of the plurality of elements 20 to permit the intraocular fluid to flow from the lumen of the length 36 of the second end portion 34 to each of the lumens of the lengths 26 and towards the outlets 24. It will be appreciated that each of the openings 42 has a diameter less than the diameter of the second end portion 34.

In one or more embodiments, the member 30 may be conveniently formed by modifying a standard medical drainage catheter readily available in clinical settings (such as hospitals) worldwide. The size (that is, gauge) of the catheter may be selected depending upon the suitability of application. In a preferred embodiment, the size of the catheter is 24G to provide a shunt drainage rate of about 6 ml/min.

The body 12 may include one or more eyelets (not shown) to facilitate suturing of the shunt 10 to the patient's eye.

The corrugated profile of the body 12 facilitates sequential filling of each of the elements 20 with intraocular fluid depending on the IOP. Thus, the shunt 10 may provide a valve effect without moving parts such that if the IOP is relatively high then fluid flow through the shunt 10 will increase thereby increasing the drainage rate. Conversely, if the TOP is relatively low then fluid flow through the shunt 10 will decrease thereby decreasing the drainage rate.

Furthermore, the corrugated tubular elements 20 have the capacity to be filled with slow-release drug formulations (for example, pellet or gel) to reduce postoperative inflammation and minimise additional scar tissue formation or have an additional TOP lowering effect if required. By virtue of the configuration of the open end portions 22 of the tubular elements 20 means the elements 20 can be refilled at a later date if required.

Figure 3:
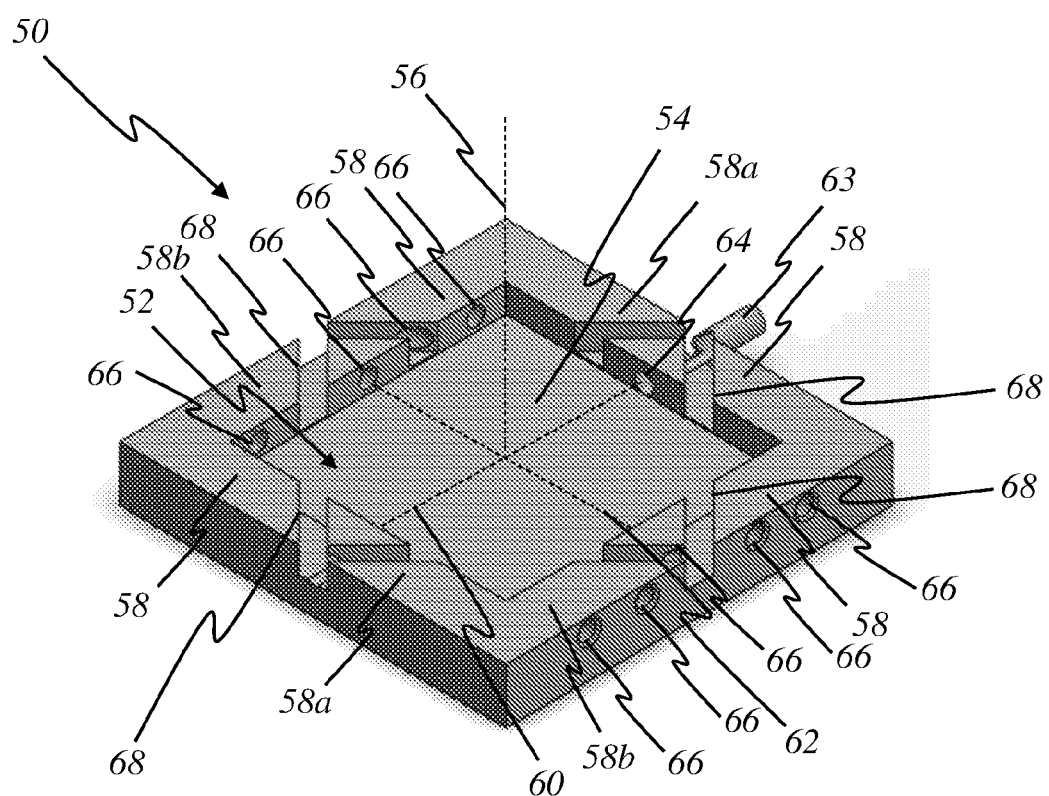
FIG. 3 is a perspective view of a device according to an embodiment of the present disclosure for guided assembly of the ocular implant of FIG. 1.

Referring to FIG. 3, there is schematically depicted a device or jig 50 for guided assembly of the shunt 10.

The jig 50 includes a base 52 being rectangular in configuration and having a generally flat receiving surface 54. A first axis 56 extends normal to the surface 54. Sidewalls 58 extend upwardly from the base 52 in a direction parallel to the axis 56 around the periphery of the base 52 to partially surround the surface 54. Each of the sidewalls 58 preferably have a height measured from the surface 54 which is greater than the width of the body 12. The sidewalls 58 are arranged in first and second pairs of opposing sidewalls 58a, 58b. The first pair of opposing sidewalls 58a is arranged perpendicularly relative to the second pair of opposing sidewalls 58b.

The jig 50 has a second axis 60 and a third axis 62, with the third axis 62 being perpendicular to the second axis 60. Each of the axes 60, 62 extend perpendicularly to the first axis 56 between a respective pair of opposing sidewalls 58. That is, the second axis 60 extends between the first pair of opposing sidewalls 58a, and the third axis 62 extends between the second pair of opposing sidewalls 58b.

The jig 50 includes a hole 64 extending through one of the sidewalls 58 of the first pair 58a in a direction parallel with the axis 60. In the embodiment depicted, the hole 64 is aligned with the axis 60 and centered between the second pair of opposing sidewalls 58b. The hole 64 has a diameter which is equal to or greater than the diameter of the tubular member 30. A cylindrical extrusion 63 is formed on the sidewall 58 concentrically with the hole 64 and extends laterally away from the sidewall 58. As will be described below, the extrusion 63 and the hole 64 are configured to act as guides for a piercing device (such as a needle) to form the passage transversely through each of the elements 20 of the body 12.

The jig 50 further includes a plurality of apertures 66 extending through each of the sidewalls 58 of the second pair 58b in a direction parallel with the axis 62. In the embodiment depicted, each of the apertures 66 are equally spaced along the sidewalls 58 of the second pair 58b. The number of apertures 66 preferably corresponds with the number of elements 20. Although, it will be appreciated that the jig 50 may have a greater number of apertures 66 than the number elements 20. Each of the apertures 66 has a diameter equal to or greater than the diameter of the openings 42. Each of the apertures 66 extending through one of the sidewalls 58 of the second pair 58b is aligned with the respective aperture 66 extending through the other sidewall 58 of the second pair 58b. As will be described below, each of the apertures 66 are configured to act as lateral guides for perforation of the second end portion 34 to form each of the openings 42.

The jig 50 further includes a plurality of straight grooves 68 cut partially through each of the sidewalls 58 down to the surface 54 and obliquely arranged relative to the axes 60, 62. It will be appreciated that the arrangement and shape of the grooves 68 may be varied. As will be described below, the grooves 68 are configured to act as guides for scalpel resection of the body 12.

A support base (not shown) may be integrally formed with the jig 50 to assist with handling of the jig 50.

The jig 50 may be fabricated by a process of three-dimensional (3D) printing using commonly available 3D printing thermoplastics (such as polylactic acid (PLA) and acrylonitrile butadiene styrene (ABS)) and computer-aided design (CAD) software. It will be appreciated that the jig 50 may be readily 3D printed and sterilised to facilitate rapid in-surgery guided assembly of the shunt 10 as will be described below. The CAD model of the jig 50 may be readily shared with developing nations and minimises costs associated with implant packaging, transport, storage and logistics compared with other implantable devices.

Figure 4:
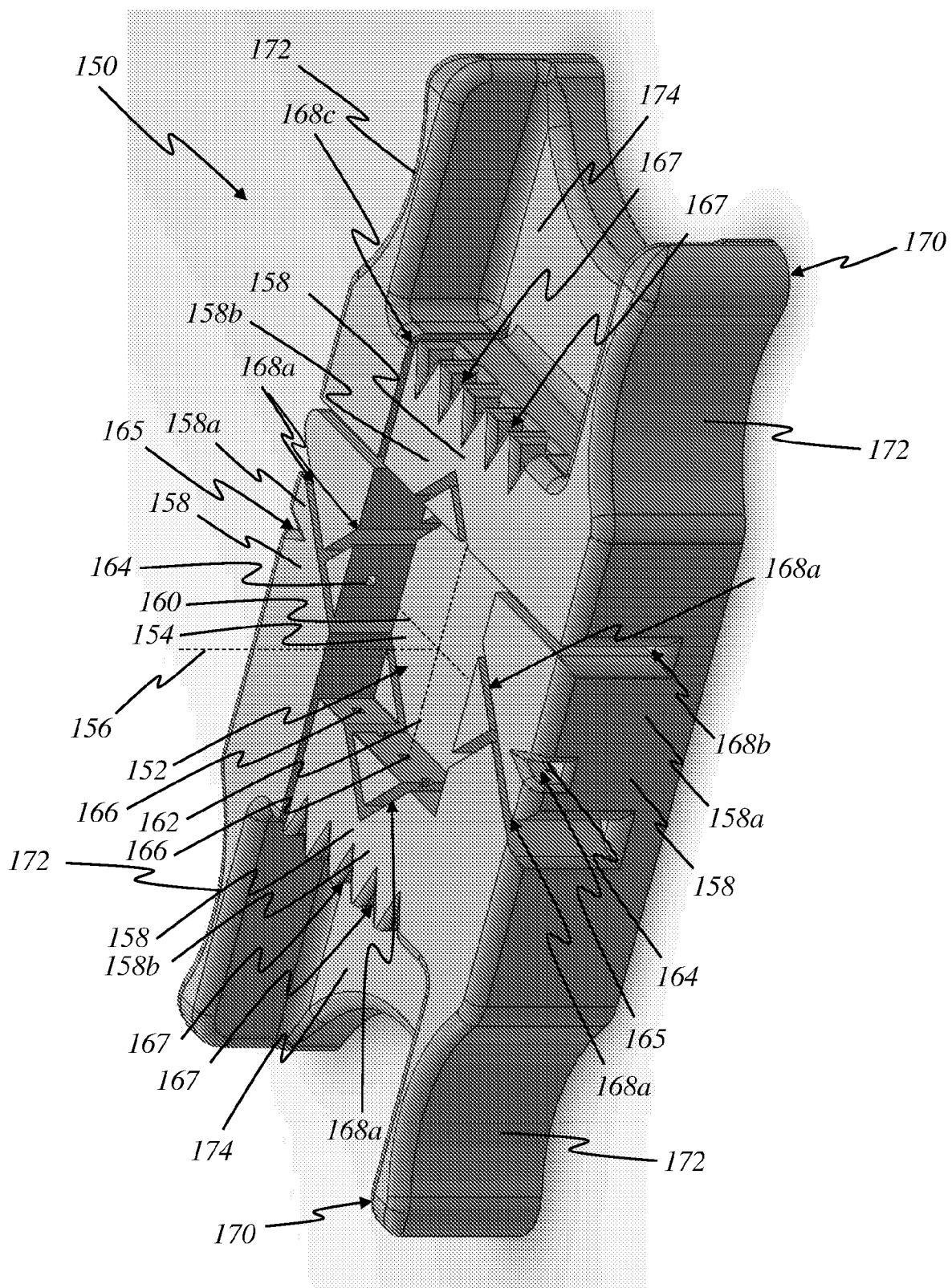
FIG. 4 is a perspective view of a device according to another embodiment of the present disclosure for guided assembly of the ocular implant of FIG. 1.

Referring to FIG. 4, there is schematically depicted a device or jig 150 for guided assembly of the shunt 10. The jig 150 is of similar basic construction to the jig 50. Features of the jig 150 that are equivalent to those of the jig 50 are provided with the same reference numeral to that of the jig 50, increased by 100.

The jig 150 includes a base 152 being rectangular in configuration and having a generally flat receiving surface 154. A first axis 156 extends normal to the surface 154. Sidewalls 158 extend upwardly from the base 152 in a direction parallel to the axis 156 around the periphery of the base 152 to partially surround the surface 154. Each of the sidewalls 158 preferably have a height measured from the surface 154 which is greater than the width of the body 12. The sidewalls 158 are arranged in first and second pairs of opposing sidewalls 158a, 158b. The first pair of opposing sidewalls 158a is arranged perpendicularly relative to the second pair of opposing sidewalls 158b.

The jig 150 has a second axis 160 and a third axis 162, with the third axis 162 being perpendicular to the second axis 160. Each of the axes 160, 162 extend perpendicularly to the first axis 156 between a respective pair of opposing sidewalls 158. That is, the second axis 160 extends between the first pair of opposing sidewalls 158a, and the third axis 162 extends between the second pair of opposing sidewalls 158b.

The jig 150 includes a pair of opposing holes 164 extending through a respective one of the sidewalls 158 of the first pair 158a in a direction parallel with the axis 160. In the embodiment depicted, the holes 164 are aligned with the axis 160 and centered between the second pair of opposing sidewalls 158b. The holes 164 have a width dimension which is equal to or greater than the diameter of the tubular member 30. The holes 164 are preferably located at a depth measured from the surface 154 which is midway of the body 12. A wedge-shaped cut-out 165 is formed at an exterior or outer end of each of the holes 164 in each of the sidewalls 158a to facilitate guiding the tubular member 30 through each of the holes 164. As will be described below, the holes 164 are configured to act as guides for a piercing device (such as a needle) to form the passage transversely through each of the elements 20 of the body 12.

The jig 150 further includes a plurality of apertures 166 extending through each of the sidewalls 158 of the second pair 158b in a direction parallel with the axis 162. In the embodiment depicted, each of the apertures 166 are equally spaced along the sidewalls 158 of the second pair 158b. The number of apertures 166 preferably corresponds with the number of elements 20. Although, it will be appreciated that the jig 150 may have a greater number of apertures 166 than the number elements 20. Each of the apertures 166 has a width dimension equal to or greater than the diameter of the openings 42. The apertures 166 are preferably located at a depth measured from the surface 154 which is midway of the body 12. Further wedge-shaped cut-outs 167 are formed at a respective exterior or outer end of each of the apertures 166 in each of the sidewalls 158b to facilitate guiding a piercing device through each of the apertures 166. Each of the apertures 166 extending through one of the sidewalls 158 of the second pair 158b is aligned with the respective aperture 166 extending through the other sidewall 158 of the second pair 158b. As will be described below, each of the apertures 166 are configured to act as lateral guides for perforation of the second end portion 34 to form each of the openings 42.

The jig 150 further includes a plurality of straight grooves 168a cut partially through each of the sidewalls 158 down to or past the surface 154 and obliquely arranged relative to the axes 160, 162. Further straight grooves 168b, 168c are formed across a respective pair of the sidewalls 158a, 158b and extend parallel with respect to the axes 160, 162, respectively, down to or past the surface 154. It will be appreciated that the arrangement and shape of the grooves 168a, 168b, 168c may be varied. As will be described below, the grooves 168a, 168b, 168c are configured to act as guides for scalpel resection of the body 12.

The jig 150 further includes a support portion 170 integrally formed with the base 152, and more specifically, integrally formed with each of the sidewalls 158b. Each support portion 170 extends in a direction generally parallel with the axis 162 away from the respective sidewall 158b. Each support portion 170 includes a pair of contoured grip portions 172 generally aligned with the sidewalls 158a to facilitate handling of the jig 150. A strengthener 174 extends between the pair of grip portions 172 to provide rigidity to the support portion 170. The strengthener 174 may also be used as a clamping surface to further facilitate handling of the jig 150.

The jig 150 may be fabricated by a process of three-dimensional (3D) printing using commonly available 3D printing thermoplastics (such as polylactic acid (PLA) and acrylonitrile butadiene styrene (ABS)) and computer-aided design (CAD) software. It will be appreciated that the jig 150 may be readily 3D printed and sterilised to facilitate rapid in-surgery guided assembly of the shunt 10 as will be described below. The CAD model of the jig 150 may be readily shared with developing nations and minimises costs associated with implant packaging, transport, storage and logistics compared with other implantable devices.

Figure 5:
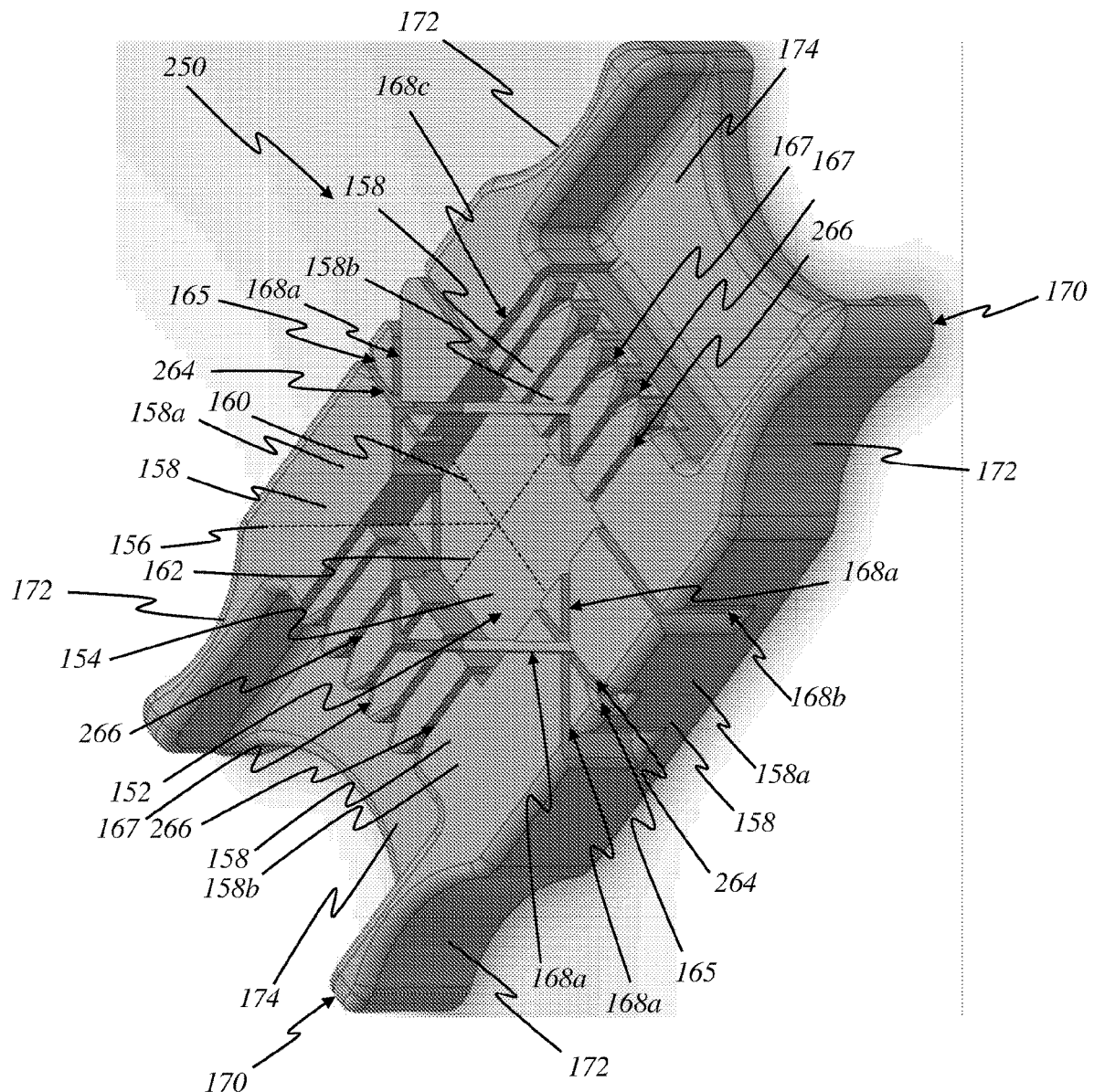
FIG. 5 is a perspective view of a device according to yet another embodiment of the present disclosure for guided assembly of the ocular implant of FIG. 1.

Referring to FIG. 5, there is schematically depicted a device or jig 250 for guided assembly of the shunt 10. The jig 250 is of an identical configuration to the jig 150, except for the configuration of the holes 164 and apertures 166. In the jig 250, the holes 164 and the apertures 166 are replaced by first and second channels 264, 266, respectively, extending linearly through the respective pair of sidewalls 158a, 158b. Each of the channels 264 has a width dimension which is equal to or greater than the diameter of the tubular member 30. Each of the channels 266 has a width dimension equal to or greater than the diameter of the openings 42. The channels 264, 266 preferably extend to a depth measured from the surface 154 which is midway of the body 12.

The remaining features of the jig 250 that are identical to the jig 150 will thus not be further described and are provided with identical reference numerals in FIG. 5.

It will be appreciated that the configuration of the channels 264, 266 may improve convenience, 3D print repeatability, and ease of mass manufacture of the jig 250 when compared to the jig 150.

Figure 6:
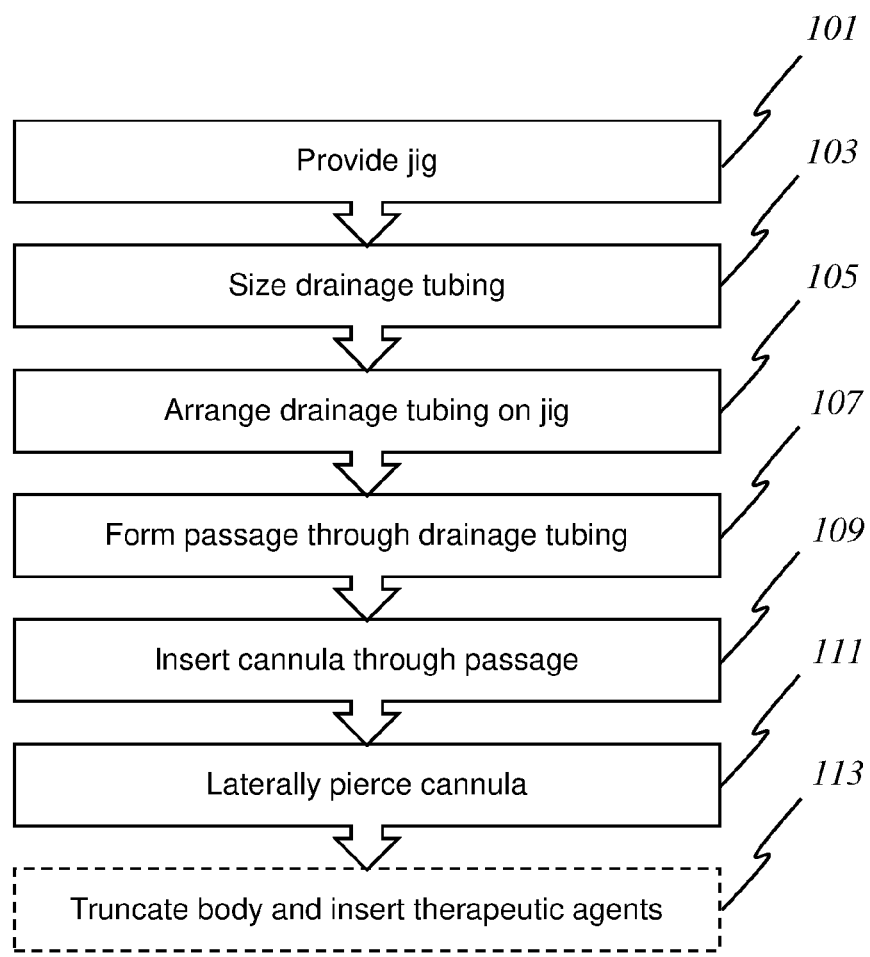
FIG. 6 is a flowchart that schematically illustrates steps associated with a method of guided assembly of the ocular implant of FIG. 1 using the device of FIG. 3, FIG. 4, or FIG. 5.

A method of guided assembly of the shunt 10 using the jig 50 will now be described with reference to the flowchart in FIG. 6.

The jig 50 is provided at step 101. A standard multitubular medical tissue drainage tubing (such as an abdominal tissue drain) is then sized, at step 103, to enable the tubing to fit on the surface 54 whilst being laterally supported by the sidewalls 58. The tubing is then located on the surface 54, at step 105, and arranged so that each of the outlets of the tubing is aligned with a respective one of the apertures 66 of the sidewalls 58 of the second pair 58b.

At step 107, a needle or other suitable piercing device is inserted through the extrusion 63 and hole 64 to pierce the tubing in a direction parallel with the axis 64 to form the passage or tunnel through the array of tubing. In this way, the body 12 of the shunt 10 is formed.

At step 109, the needle is removed and a cannula (or other suitable silicone tubing) of predetermined gauge is inserted through the extrusion 63 and hole 64 and partially positioned within the passage of the tubing array, that is, through the body 12. Alternatively, it will be appreciated that the cannula may be introduced within the passage at step 107 by being provided at the operative end of the needle as the needle pierces the tubing and as the needle is subsequently withdrawn from the tubing partially leaving behind the cannula within the passage.

At step 111, a further needle or other suitable piercing device is successively inserted through each of the apertures 66 and through the outlets of the tubing to pierce the cannula laterally to create each of the openings 42. In this way, the member 30 is formed. It will be appreciated that the needle used to form the passage may be retained within the body 12 whilst the further needle is used to form each of the openings 42.

The body 12 of the shunt 10 may then be truncated, at optional step 113, by utilising the grooves 68 for guided scalpel resection of the body 12 to readily conform the body 12 to a spheroidal geometry or to remove unnecessary tubing material to reduce the effective stiffness of the shunt 10. This may at least aid in reducing the edge profile of the shunt 10 for erosion. Therapeutic agents may be inserted (and periodically topped-up) into each of the elements 20 of the parallel tubing array as a paste, or as a liquid entrapped using a blocking agent (e.g. medical grade carbomethylcellulose or vaseline) to allow gradual localised release of the agents. The clinician may define the dose as per the patient-specific need.

The assembled shunt 10 may then be removed from the jig 50 and subsequently implanted into a patient using conventional methods.

It will be appreciated that the method of guided assembly of the shunt 10 using the jig 50 described above may also be followed in a substantially similar manner using the jigs 150, 250 in place of the jig 50. It will be appreciated that the wedge-shaped cut-outs 165, 167 of the jigs 150, 250 may facilitate guided entry of the needle or other suitable piercing device and the cannula during steps 107, 109 and 111. The grip portions 172 and strengtheners 174 of the jigs 150, 250 may further facilitate handling of the jigs 150, 250 during steps 107, 109, 111, and 113.

In another aspect of the present disclosure, the jigs 50, 150, 250 may be used to mould a fast-setting biocompatible elastomer resin chassis (not shown) around the member 30. This can either replace the parallel tubing array or augment the tubing array by helping it set with a spheroidal contour. This may mitigate migration of the shunt. There may be a second jig that is used to conform the parallel tubing array to a spheroidal contour that matches the patient's eye and/or to assist with surgical implantation and secure anchorage. The jig design may be adjusted in the clinic to match the diameter and/or shape of the patient's eye anatomy for the given deployment location. The elastomer resin may consist of liquid silicone resin (platinum-catalysed liquid silicone rubber), thermoplastic polyurethane resin, thermoplastic, polycaprolactone, or other low durometer (20A-55D shore hardness) fast-setting biocompatible elastomer. The polymer materials used may be biostable or partially bioresorbable or partially dissolvable.

In a further aspect of the present disclosure, the chassis described above may contain a plurality (typically 1-4) reservoirs that can be used to help modulate IOP changes, and may for example be used to store and gradually release bioactive therapeutics that assist with managing glaucoma or antibiotics or antibacterial agents, anti-blockage agents, or a biocompatible agent that can be used to infer the flow-rate within the shunt. The reservoirs may be periodically topped-up by an ophthalmologist. In a further iteration, a specialized applicator may be used by an optometrist re-fill the eluting reservoirs with glaucoma medication and the like.

In a further aspect of the present disclosure, the chassis and shunt tube are both templated using 3D printing process using fast-setting biocompatible elastomer resin (e.g. platinum-catalysed liquid silicone rubber). The templated shunt may contain a change in lumen cross section in a portion of the shunt to form a bulb along the length of the tube. This bulb may be cylindrical or spheroidal in shape. The bulb shape factor will allow for the active pressure of the shunt liquid to affect the size of the bulb such that IOP may be inferred in real-time by monitoring the profile of the bulge caused by the bulb under the sclera of the patient's eye.

It will be appreciated that the shunt 10 and jigs 50, 150, 250 described above may provide a relatively low-cost, effective, robust, and safe intervention for the treatment of glaucoma utilising readily available clinical consumables.

A person skilled in the art will appreciate that various modifications to the shunt and/or the jigs described may be made without departing from the scope of the disclosure of the present specification.

REFERENCE LIST

10 Shunt
12 Body
14 Proximal side portion
16 Distal side portion
18 Lateral side portion
20 Tubular element
22 End portion of tubular element
24 Outlet 168*a-b* Grooves
26 Length of tubular element
28 Axis of symmetry
30 Tubular member
32 First end portion of tubular member
34 Second end portion of tubular member
36 Length of tubular member
38 Inlet
40 End of tubular member
42 Openings
50 Jig
52 Base
54 Receiving surface
56 First axis
58 Sidewalls
58*a* First pair of opposing sidewalls
58*b* Second pair of opposing sidewalls
60 Second axis
62 Third axis
63 Cylindrical extrusion
64 Hole
66 Apertures
68 Grooves
150 Jig
152 Base
154 Receiving surface
156 First axis
158 Sidewalls
158*a* First pair of opposing sidewalls
158*b* Second pair of opposing sidewalls
160 Second axis
162 Third axis
164 Hole
166 Apertures
170 Support portion
172 Grip portion
264 First channel
266 Second channel

The invention claimed is:

1. An ocular implant for conveying intraocular fluid away from a site of excess intraocular fluid within a patient, the implant including:
    an elongated tubular member comprising a first end portion providing an inlet, a second end portion providing an end, and a lumen extending between the inlet and the end; and
    a body including a plurality of elongated tubular elements in fluid communication with the elongated tubular member, each of the plurality of elongated tubular elements having a length extending between a pair of outlets, with each outlet being fluidly communicable with a drainage site located away from the site of excess intraocular fluid, the outlets of the pair of outlets being positioned on different sides of the elongated tubular member; and
    wherein the inlet is fluidly communicable with the site of excess intraocular fluid so that the intraocular fluid is able to flow past the inlet and through the lumen towards the end,
    wherein the second end portion includes a plurality of openings each fluidly communicable with a respective one of the lengths of the plurality of elongated tubular elements to permit the intraocular fluid to flow from the second end portion to each of the outlets, and
    wherein adjacent elements are directly joined to one another along their respective lengths.

2. The implant of claim 1, wherein each of the elements are arranged parallel to each other to form an array.

3. The implant of claim 2, wherein the second end portion is located at least partially within the body and extends transverse to the array.

4. The implant of claim 1, wherein the second end portion extends transversely through each of the elements.

5. The implant of claim 1, wherein the elongated tubular member is formd from a medical drainage catheter.

6. The implant of claim 1, wherein the body is formed from a multitubular medical drain.

* * * * *